(12) United States Patent
Grivas et al.

(10) Patent No.: US 7,076,234 B2
(45) Date of Patent: Jul. 11, 2006

(54) METHOD AND APPARATUS FOR REDUCING PEAK CURRENT LEVELS IN A COMMUNICATION UNIT

(75) Inventors: Chris Grivas, Crystal Lake, IL (US); Andrew S. Lundholm, Hoffman Estates, IL (US)

(73) Assignee: Motorola, Inc., Schaumburg, IL (US)

( * ) Notice: Subject to any disclaimer, the term of this patent is extended or adjusted under 35 U.S.C. 154(b) by 129 days.

(21) Appl. No.: 10/319,173

(22) Filed: Dec. 13, 2002

(65) Prior Publication Data
US 2004/0116161 A1     Jun. 17, 2004

(51) Int. Cl.
*H04B 1/16* (2006.01)
(52) U.S. Cl. .................... 455/343.1; 455/572; 455/574
(58) Field of Classification Search .. 455/343.1–343.5, 455/574, 550.1, 572
See application file for complete search history.

(56) References Cited

U.S. PATENT DOCUMENTS

| | | | | |
|---|---|---|---|---|
| 3,590,323 A | | 6/1971 | Mapham et al. ............... 317/22 |
| 4,209,826 A | | 6/1980 | Priegnitz ...................... 363/21 |
| 4,524,412 A | | 6/1985 | Eng ............................. 363/26 |
| 5,175,759 A | * | 12/1992 | Metroka et al. .......... 455/569.1 |
| 5,487,181 A | * | 1/1996 | Dailey et al. ............... 455/90.2 |
| 5,680,112 A | * | 10/1997 | Xydis .................... 340/636.15 |
| 5,970,419 A | * | 10/1999 | Terashima et al. .......... 455/566 |
| 6,119,023 A | * | 9/2000 | Tomiyori ..................... 455/574 |
| 6,256,007 B1 | * | 7/2001 | Walukas et al. ............. 345/102 |
| 6,404,145 B1 | * | 6/2002 | Saito ......................... 315/307 |

* cited by examiner

*Primary Examiner*—William Trost
*Assistant Examiner*—James D. Ewart
(74) *Attorney, Agent, or Firm*—Charles W. Bethards

(57) ABSTRACT

A wireless communications unit 200, and corresponding method 300 within, is arranged and constructed for reducing peak current levels on a power source for the communications unit and comprises: one function, such as a transmitter 203 that is selectively enabled according, for example to an on/off duty cycle; an other function, such as a backlighting apparatus 214, 218 or accessory device 225 that is controllably supplied with a current where the current can be intermittently interrupted without adversely effecting utility of the other function; and a controller 209 for enabling the function or transmitter according to the on/off duty cycle and, when enabled, interrupting the current provided to the other function.

23 Claims, 3 Drawing Sheets

US 7,076,234 B2

METHOD AND APPARATUS FOR REDUCING PEAK CURRENT LEVELS IN A COMMUNICATION UNIT

FIELD OF THE INVENTION

This invention relates in general to communication equipment, and more specifically to a method and apparatus for reducing peak current drains in communications units.

BACKGROUND OF THE INVENTION

Communications equipment and units are known. Many of these communications units are now battery powered. With the emphasis on size and weight of the communications units and thus batteries, together with the desire for extended battery life, manufacturers of the wireless communications units have been using battery technologies and sizes that place an upper limit on peak current capabilities. At the same time more features, such as color displays and others requiring additional processing capacity, are being demanded.

The emphasis on battery life has resulted in most if not all manufacturers disabling any power consuming functionality unless it is deemed to be required or essential. Still peak current values may be dangerously close or over reasonable limits for the present battery technologies and sizes that are being used for some current generation wireless communications units.

Clearly a need exists for apparatus and methods that can advantageously reduce peak current levels without adversely impacting user satisfaction with wireless communications units.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

DETAILED DESCRIPTION OF PREFERRED EMBODIMENTS

Figure 1:
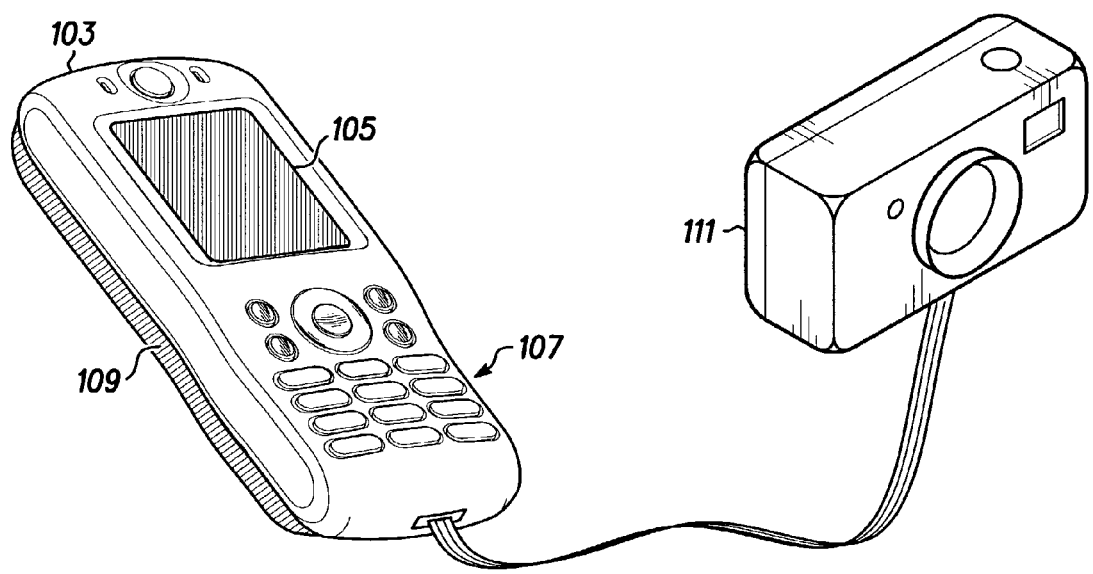
FIG. 1 depicts, a simplified and exemplary overview diagram for setting the context within which the preferred embodiment operates.

In overview, the present disclosure concerns wireless communications units or subscriber units or devices that facilitate services and specifically communications services such as cellular phone services and the like for users thereof. More particularly various inventive concepts and principles embodied in apparatus and methods for limiting or reducing or controlling peak current drains or levels at or within a subscriber or wireless communications unit are discussed and described. The communications units of particular interest are those being deployed and developed to operate in systems commonly known as GSM (Global System for Mobile communication), GPRS (General Packet Radio System), IS-95 CDMA (Code Division Multiple Access), CDMA 2000, integrated digital enhanced network (IDEN), 2.5 G or EDGE, and 3 G or W-CDMA (Wideband CDMA) (UMTS) systems or variations and evolutions thereof that are suitable for providing services to wireless communications units and advantageously use a transmitter or other function on a duty cycle basis. As further discussed below, various inventive principles and combinations thereof are advantageously employed to limit peak current levels or drains in a fashion that is transparent at the wireless communications unit, thus alleviating various problems, such as undue battery consumption or failure or unit shutdown associated with known limiting approaches while still facilitating appropriate system performance, provided these principles or equivalents thereof are utilized.

The instant disclosure is provided to further explain in an enabling fashion the best modes of making and using various embodiments in accordance with the present invention. The disclosure is further offered to enhance an understanding and appreciation for the inventive principles and advantages thereof, rather than to limit in any manner the invention. The invention is defined solely by the appended claims including any amendments made during the pendency of this application and all equivalents of those claims as issued.

It is further understood that the use of relational terms, if any, such as first and second, top and bottom, and the like are used solely to distinguish one from another entity or action without necessarily requiring or implying any actual such relationship or order between such entities or actions. Much of the inventive functionality and many of the inventive principles are best implemented with or in software programs or instructions and integrated circuits (ICs) such as application specific ICs. It is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation. Therefore, in the interest of brevity and minimization of any risk of obscuring the principles and concepts according to the present invention, further discussion of such software and ICs, if any, will be limited to the essentials with respect to the principles and concepts used by the preferred embodiments.

Referring to FIG. 1 a simplified and exemplary overview diagram for setting the context within which the preferred embodiment operates will be discussed and described. FIG. 1 shows a wireless communications unit 103, such as a cellular handset or subscriber device that is arranged and constructed to and includes a peak current level limiter for limiting or reducing peak current levels. This wireless communications device includes a display 105 for providing or displaying information such as phone numbers, battery charge status, signal strength, names, caller ID information, data messages, various graphics and so on to the user of the unit. Typically the display is a passive liquid crystal type of display that requires some form of backlighting during low ambient light conditions. The wireless communications unit or device further comprises a keypad 107 that includes various numeric or alphanumeric keys and control keys, such as Send, End, and Menu keys. The keypad 107 is also normally backlit to facilitate operation of the wireless communications unit by a user in low ambient light conditions. Further depicted is a battery 109 that may be internally contained but typically occupies a substantial portion of the total volume and accounts for much of the weight of the wireless communications unit. Additionally an accessory 111, such as a camera or the like, is shown coupled to and may be powered from the wireless communication unit's battery.

Typically the wireless communication unit spends the vast majority of the time in a quiescent state, periodically awakening to see whether any calls are being directed to it. In this mode manufacturers and system designers have devoted significant efforts, especially with more recently deployed systems, to keep the current level or drain quite low, thus battery life as long as possible. Another more or less typical case is where the user is interacting with the wireless communications unit, updating phone books and the like or using the accessory device. Normally in these situations while the average current drain is much higher the peak current levels will not be a problem. However, when the wireless communications unit is active or engaged in a communications with the system, the peak current levels can be quite high, approaching safe limits for current battery technologies. The unit may be engaged in a communication with another user or the unit may simply be engaged in overhead communications, such as registration or periodic reporting activities, with the system. In present or more current systems the transmitter is not usually enabled for an extended period of time. For example, in a GSM system the transmitter will be enabled, thus drawing current, at a 217 Hz rate for approximately 542.8 microseconds each time it is enabled. This is approximately ⅛ or 12.5% of the time. When the transmitter is enabled the wireless communications unit has in one experimental example been shown to consume approximately 1.8 amperes of current from the unit's battery. This is dangerously close to the shut down value of 2.0 amperes. The present disclosure, in one aspect, advantageously takes the duty cycle into consideration and interrupts power or current provided to those functions that would otherwise consume power so long as the interruption does not adversely impact the utility of the function. Good examples of functions where this can be done include the backlighting functions and the external accessory power supplies.

Figure 2:
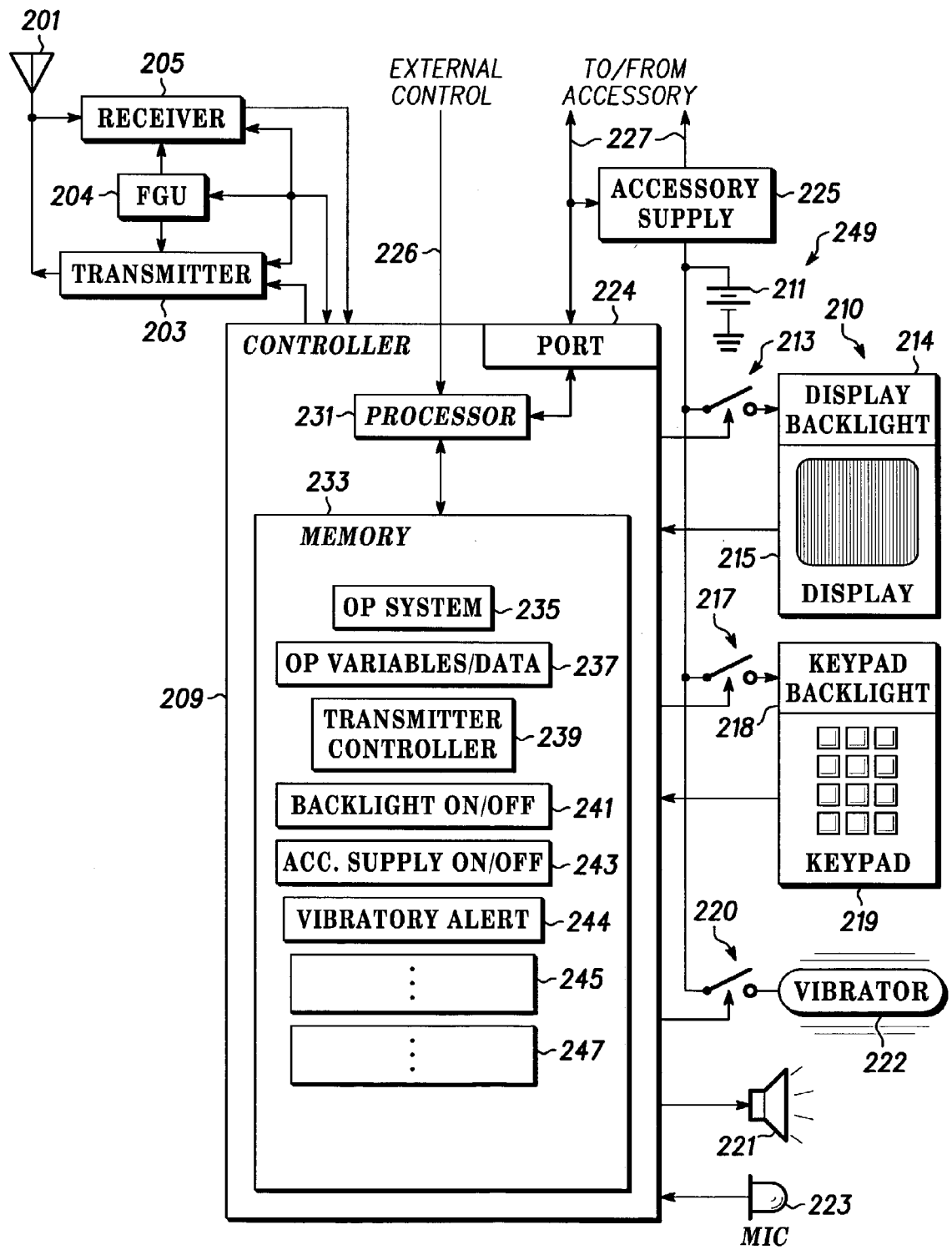
FIG. 2 depicts a block diagram of a preferred embodiment of a wireless communications unit arranged to reduce peak current levels.

Referring to FIG. 2 a block diagram of a preferred embodiment of a wireless communications unit will be discussed and described. This wireless communications unit basic block diagram is similar to most cellular phones or handsets such as those available from various manufacturers, such as Motorola, except for the additional and inventive elements and processes herein described. The functions of many of the blocks are similarly known and will not be unduly dwelled upon. Wireless communications units that are able to utilize multiple access technologies with have relatively more complicated functional blocks but these are also known. Generally, the block diagram of FIG. 2 depicts a wireless communications unit 200 that is arranged and constructed for, among other communications functions, reducing peak current levels on or required of a power source, such as the battery, for the wireless communications unit.

As depicted the communications unit includes an antenna structure 201 for radiating radio frequency signals from a transmitter 203 and absorbing or receiving radio frequency signals for a receiver 205. The receiver 205 and transmitter 203 are each coupled to a frequency generation unit (FGU) 204 that includes, for example, one or more known frequency synthesizers that generate signals with frequencies that determine what frequency the receiver 205 is tuned to or what frequency the transmitter 203 transmits on. The FGU 204, receiver 205 and transmitter 203 are inter coupled to a controller 209 (controller and signal processor) by a control signal bus. The transmitter 203 and possibly receiver 205 are, preferably, selectively enabled by the controller 209 according to an on/off duty cycle for communicating with a network (not shown). Additionally, the receiver 205 provides a received or base band signal to the controller 209 for received signal processing or decoding and a transmit base band signal is provided by the controller 209 to the transmitter 203 for transmission as required. The controller 209 operates to control the FGU 204, transmitter 203, and receiver 205 and provide proper signals to and from the transmitter 203 and receiver 205.

The controller 209 is also inter coupled to a user interface 210 that is further coupled to a battery 211 or power source that is coupled to the battery that provides power and current to the controller 209, FGU 204, receiver 205, and transmitter 203. The user interface 210 includes, a switch 213 controlled by the controller to provide or to interrupt current or power to a display backlight arrangement 214, a display 215 such as a liquid crystal display (LCD), a switch 217 also controlled by the controller to provide or to interrupt current or power to a keyboard backlight arrangement 218, a conventional backlit keypad 219, a switch 220, also controlled by the controller, to provide or to interrupt current or power to a vibratory alert apparatus 222, as well as a speaker 221 or earpiece, a microphone 223, and possibly other user interface devices (not depicted) all generally known. The backlight arrangements or functions 214, 218 may utilize either an LED, incandescent or electrolumenescent (EL) panel backlighting arrangement that in the case of LEDs or incandescent bulbs includes a light pipe or light spreader as is known. These elements operate to provide control and utility to a user of the communications unit. The user interface will support, via the display 215 and keyboard 219 or keypad, user discretionary decisions and inputs. The controller may also be coupled via a port 224, such as a USB, serial, parallel, or the like port, to an accessory device as well as accessory power supply 225 that is powered from the battery 211 where the controller again controls whether current is provided or when current into the supply is interrupted. This control of the accessory supply or accessory function by the controller may be responsive to an external control line 226. Further, the external control line 226 may be used to activate, in whole or part, the peak limiting methods disclosed herein.

In any event the controller 209 comprises a processor 231 that is preferably one or more microprocessors and digital signal processors suitable to perform the control and signal processing functions of the wireless communications unit that are generally known, except for the novel and advantageous concepts and principles for limiting current levels that are herein described. The controller 209 further comprises a memory 233, coupled to the processor, that is preferably a combination of RAM, ROM, EEPROM or magnetic based memory. The memory 233 stores software instructions and data that when executed and utilized by the processor 231 results in the controller 209 controlling the wireless communications device 200 and processing signals appropriately. The memory 233 includes a basic operating system 235, operating variables and data 237, a transmitter control routine 239, a backlight routine 241 that is used to controls the switches 213, 217 in order to turn the backlighting on or off, an accessory supply control routine 243, an on/off vibratory alert apparatus control routine 244 used to control the switch 220 in order to turn the vibratory alert apparatus on and off, possible other on/off control routines 245, and various other routines 247 required to control the communications unit that are not here relevant but that will be understood and appreciated by one of ordinary skill.

Generally the controller 209, specifically the processor 231 executing the proper instructions or routines, is coupled to the various functions, such as transmitter 203, backlighting, accessory power supply and vibratory alert so as to control current that is provided to each of these functions as appropriate to preserve the utility of the respective function and yet limit or reduce the peak current levels that would otherwise result. Note that the functions, such as backlighting of the display or keypad, input power to the accessory power supply, and vibratory alert are functions where the current can be intermittently interrupted without adversely effecting the utility of the functions, such as the power supply, the backlighting arrangements, or vibratory alert apparatus. The controller is coupled to the transmitter 203 and one or more of the functions and operates or is operable for enabling the transmitter 203 according to the on/off duty cycle via the routine 239 as required by the particular access or air interface technology and, when the transmitter 203 is enabled and thus drawing current, for interrupting the current, if any, to the function using the appropriate routine 241, 243, 244, 245.

Note that the interruption is merely a safe guard as in many cases the function will not be consuming power. For example, the keypad backlighting will be disabled when the unit is transmitting unless a key has been activated within the 25–30 second programmable time out period or a user has programmed the unit so the backlighting is always on, or when the unit is active. Of course the accessory supply is usually enabled if an accessory is attached although the state of the accessory will determine the amount of current drawn. Also note that an intermittent interruption of approximately ½ milli-second at a 217 Hz rate for the backlighting or vibratory alert will not be noticed by a user nor is such an interruption at the input of a power supply likely to impact the output. Specifically these functions will continue to provide, without adverse impact, whatever utility they were intended to provide.

In order to interrupt the current drain of a function the controller 209 opens a controllable switch 213, 217, 220 or a switch at the input to the accessory supply (not depicted) between a power source or battery and the function. If the wireless communications unit includes multiple functions that are controllably supplied with current or power where the current can be intermittently interrupted without adversely effecting utility of either function (two backlighting arrangements, an accessory supply, and vibratory alert, for example); the controller 209, when the transmitter 203 is enabled, can interrupt either or both of the current to one function and the current to the other function. In these cases when multiple interruptible functions are available and controllable, the controller may alternately interrupt the current to one and the other function, etc., in a predetermined fashion or according to a predetermined pattern, when the transmitter 203 is enabled. This may be particularly useful if the on period of the transmitter 203 is sufficiently long that the interruption in the current to one or more of the functions became noticeable such that the utility of the function is impaired.

As noted and suggested above functions that may particularly suited for controllably interrupting the power or current supplied to them include backlighting functions, vibratory alerting apparatus, and accessory apparatus or power supplies therefore. The backlighting function can include either or both keypad backlighting and display backlighting arrangements or functions. The keypad backlighting and display backlighting functions further may include light emitting diodes, incandescent bulbs, or electroluminescent panel backlighting and light spreaders as appropriate. Note that in one wireless communications unit the display and keypad backlighting include 8 light emitting diodes that collectively draw approximately 100 milli-amperes. Incandescent bulbs may have higher drains and EL panels will be lower. The accessory apparatus may comprise, for example, a universal serial bus apparatus, that is powered by the wireless communications device. The universal serial bus apparatus will require a USB power supply that may be powered by the wireless communications device and may further comprise a USB camera or other USB device.

In summary, the wireless communications device executes a method of reducing peak current levels and functionally includes a peak current limiter 249 that is arranged and constructed for reducing peak current levels drawn from a power source for the wireless communications unit. The peak current limiter 249 in one embodiment comprises a transmitter 203 that is selectively enabled according to an on/off duty cycle for communicating with a network; a backlighting function that requires a current to operate; and a controller, coupled to the transmitter 203 and the backlighting function, for enabling the transmitter 203 according to the on/off duty cycle and, when and while the transmitter 203 is enabled, interrupting the current to the backlighting function. The controller preferably opens a controllable switch between the power source and the backlighting function in order to interrupt the current. The backlighting function preferably comprises keypad backlighting or display backlighting where either may be arranged and constructed using light emitting diodes, incandescent bulbs, or electroluminescent panel backlighting or a combination of any of these technologies.

Figure 3:
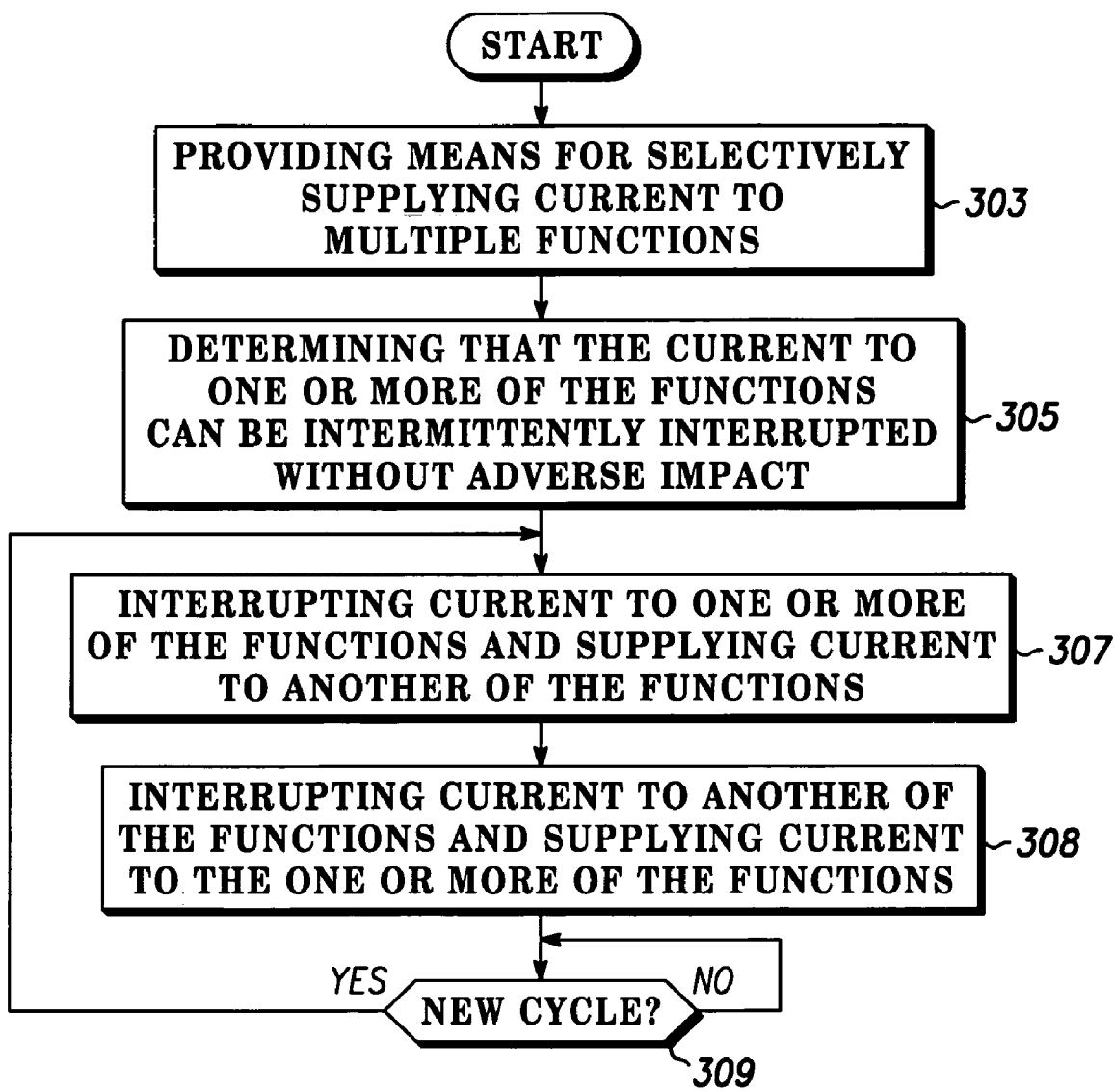
FIG. 3 illustrates a flow chart of a preferred method embodiment of reducing peak current levels.

Referring to FIG. 3 a flow chart of a preferred method embodiment of reducing peak current levels, preferably within a wireless communications unit will be discussed and described. Much of this discussion will be at a more general level but also will be in the nature of a review as many of the concepts and principles have been discussed above. FIG. 3 shows a method 300 in a wireless communications unit for reducing peak current levels that starts and at 303 depicts providing a means for selectively supplying current to multiple functions, such as a first current to a first function, a second current to a second function, and so on. This may amount to providing a controllable switch between a power source and the respective function or some other activity such as supplying a signal at the input of a selectively enabled function, such as a transmitter 203.

The selectively supplying a current to multiple functions such as a first and second function may comprise providing a means for selectively enabling one of a backlighting function, vibratory alert, and an accessory apparatus. The selectively enabling a backlighting function may comprises means for selectively enabling one of a keypad backlighting and a display backlighting function. The selectively enabling one of a keypad backlighting and a display backlighting function may include a controllable switch to selectively enable either light emitting diodes, incandescent bulbs, or an electroluminescent panel for backlighting. Selectively enabling an accessory apparatus may comprises means for selectively enabling a universal serial bus apparatus, such as a universal serial bus camera that is powered by the wireless communications device.

At 305, determining that the current to one or more of the functions can be intermittently interrupted without adversely effecting a corresponding utility of the one or more functions is shown. This may amount to the analysis and observations above with respect to backlighting arrangements, vibratory alert, or power supplies for accessories. Then 307 shows interrupting the current to one or more of the functions, such as backlighting, vibratory alert, or accessory apparatus, when the current can be intermittently interrupted without adversely effecting the utility of the corresponding function and supplying current to another of the functions, such as the transmitter 203. For example if there were three functions you would provide a means for selectively supplying current to each function; then determine that the current may be intermittently interrupted without adversely effecting a utility of two of the functions; and supply current to the third function after interrupting the current to the two functions while the current is supplied to the third function. The interruption of the current to the two functions, such as backlighting functions may comprise alternately interrupting the current to each of the two functions, preferably in a predetermined manner, while the current is supplied to the third function, such as a transmitter 203.

At any rate at 308, the current to the other of the functions, such as the transmitter 203 is interrupted and current is once more supplied to those functions, such as backlighting and accessory devices or apparatus. At 308 it is determined whether a new cycle is indicated and if not the test is repeated and if so the process returns to 307

The processes and apparatus discussed above and the inventive principles thereof are intended to and will alleviate problems caused by prior art peak current limiting schemes. Using these principles of choosing functions based on the ability to intermittently interrupt the current or power being provided to the respective function, such as backlighting arrangements and the like and interrupting the current drain to these functions while other high current drain functions, such as transmitters are enabled will allow peak current levels to be reduced sufficiently such that a user of a communications unit, such as a cellular handset can enjoy performance benefits and additional features with out a risk of encountering peak current limits beyond safe limits thus facilitating enhanced user satisfaction. It is expected that one of ordinary skill given the above described principles, concepts and examples will be able to implement other alternative procedures that are subscriber or wireless unit or system characteristic dependent and that will also offer or facilitate similar performance benefits. It is expected that the claims below cover most such alternatives.

This disclosure is intended to explain how to fashion and use various embodiments in accordance with the invention rather than to limit the true, intended, and fair scope and spirit thereof. The foregoing description is not intended to be exhaustive or to limit the invention to the precise form disclosed. Modifications or variations are possible in light of the above teachings. The embodiment(s) was chosen and described to provide the best illustration of the principles of the invention and its practical application, and to enable one of ordinary skill in the art to utilize the invention in various embodiments and with various modifications as are suited to the particular use contemplated. All such modifications and variations are within the scope of the invention as determined by the appended claims, as may be amended during the pendency of this application for patent, and all equivalents thereof, when interpreted in accordance with the breadth to which they are fairly, legally, and equitably entitled.

What is claimed is:

1. A method in a wireless communications unit for reducing peak current levels, the method comprising:

providing a means for selectively supplying a first current to a first function and a second current to a second function;

determining that the first current can be intermittently interrupted without adversely effecting a utility of the first function; and supplying the second current to the second function and interrupting the first current to the first function when the first current can be intermittently interrupted without adversely effecting the utility of the first function, wherein:

the providing a means further comprises providing a means for selectively supplying a third current to a third function;

the determining that the first current can be intermittently interrupted without adversely effecting a utility of the first function further comprises determining that the third current can be intermittently interrupted without adversely effecting a utility of the third function; and the supplying the second current to the second function and interrupting the first current to the first function when the first current can be intermittently interrupted without adversely effecting the utility of the first function further comprises interrupting one of the first current to the first function and the third current to the third function while the second current is supplied to the second function.

2. The method of claim 1, wherein the providing a means further comprises providing a controllable switch between a power source and at least one of the first and the third function.

3. The method of claim 1 wherein the supplying the second current to the second function and interrupting the first current to the first function further includes one of alternately interrupting the current to the second function and the first function and interrupting in a predetermined manner the current to the second function and the first function.

4. The method of claim 1 wherein, the providing a means for selectively supplying the second current to the second function further comprises providing a means for selectively enabling a transmitter.

5. The method of claim 1, wherein the interrupting one of the first current to the first function and the third current to the third function further comprises alternately interrupting the first and the third current while the second current is supplied to the second function.

6. The method of claim 1, wherein the providing a means for selectively supplying a first current to a first function and a second current to a second function further comprises providing a means for selectively enabling one of a backlighting function, a vibratory alert, and an accessory apparatus.

7. The method of claim 6 wherein the means for selectively enabling a backlighting function further comprises means for selectively enabling one of a keypad backlighting and a display backlighting function.

8. The method of claim 7 wherein the means for selectively enabling one of a keypad backlighting and a display backlighting function further includes a controllable switch to selectively enable one of light emitting diode, incandescent bulb, and electroluminescent panel backlighting.

9. The method of claim 6 wherein the means for selectively enabling an accessory apparatus further comprises means for selectively enabling a universal serial bus apparatus that is powered by the wireless communications device.

10. The method of claim 9 wherein the means for selectively enabling a universal serial bus apparatus that is powered by the wireless communications device further comprises means for selectively enabling a universal serial bus camera that is powered by the wireless communications device.

11. The method of claim 9 wherein the means for selectively enabling a universal serial bus apparatus comprises an externally control signal.

12. A wireless communications unit arranged and constructed for reducing a peak current levels on a power source for the wireless communications unit, the wireless communications unit comprising:
   a transmitter that is selectively enabled according to an on/off duty cycle for communicating with a network;
   a first function that is controllably supplied with a first current and a second function that is controllably supplied with a second current the first function and the second function differing from the transmitter; and
   a controller, coupled to the transmitter, the first function, and the second function, for enabling the transmitter according to the on/off duty cycle and, when the transmitter is enabled, interrupting at least one of the first current to the first function and the second current to the second function to maintain the peak current level below an upper limit.

13. The wireless communications unit of claim 12, wherein the controller further opens a controllable switch between a power source and the first function in order to interrupt the first current.

14. The wireless communications unit of claim 12, wherein the first current and the second current can be intermittently interrupted without adversely effecting a utility of the first and the second function.

15. The wireless communications unit of claim 14, wherein the controller is further for alternately interrupting the first and the second current when the transmitter is enabled.

16. The wireless communications unit of claim 12, wherein the first function is one of a backlighting function and an accessory apparatus.

17. The wireless communications unit of claim 16 wherein the backlighting function further comprises one of a keypad backlighting and a display backlighting function.

18. The wireless communications unit of claim 17 wherein the one of a keypad backlighting and a display backlighting function further includes one of light emitting diode, incandescent bulb, and electroluminescent panel backlighting.

19. The wireless communications unit of claim 16 wherein the accessory apparatus further comprises a universal serial bus apparatus that is powered by the wireless communications device.

20. The wireless communications unit of claim 19 wherein the universal serial bus apparatus that is powered by the wireless communications device further comprises a universal serial bus camera that is powered by the wireless communications device.

21. A peak current limiter arranged and constructed for reducing peak current levels on a power source for the wireless communications unit, the peak current limiter comprising:
   a transmitter that is selectively enabled according to an on/off duty cycle for communicating with a network;
   a backlighting function that requires a current to operate, the backlighting function further comprising a keypad backlighting function and a display backlighting function each requiring a respective controllably interruptible current to operate; and
   a controller, coupled to the transmitter and the backlighting function, for enabling the transmitter according to the on/off duty cycle and, when and while the transmitter is enabled, interrupting the respective controllably interruptible current to the keypad and the display backlighting function.

22. The peak current limiter of claim 21, wherein the controller further opens a controllable switch between the power source and the backlighting function in order to interrupt the current.

23. The peak current limiter of claim 21 wherein the keypad backlighting and the display backlighting function further includes one of light emitting diode, incandescent bulb, and electroluminescent panel backlighting.

* * * * *